US012682722B2

(12) United States Patent
Macke et al.

(10) Patent No.: US 12,682,722 B2
(45) Date of Patent: Jul. 14, 2026

(54) LIMITED PAYOUT SYSTEMS AND METHODS

(71) Applicant: Primero Games, LLC, Norcross, GA (US)

(72) Inventors: Michael M. Macke, Duluth, GA (US); Mark C. Nizdil, Duluth, GA (US); Barry W. Rutherford, Duluth, GA (US)

(73) Assignee: PRIMERO GAMES, LLC, Norcross, GA (US)

( * ) Notice: Subject to any disclaimer, the term of this patent is extended or adjusted under 35 U.S.C. 154(b) by 274 days.

(21) Appl. No.: 18/510,081

(22) Filed: Nov. 15, 2023

(65) Prior Publication Data

US 2025/0157294 A1 May 15, 2025

(51) Int. Cl.
*G07F 17/32* (2006.01)

(52) U.S. Cl.
CPC ...... *G07F 17/3244* (2013.01); *G07F 17/3204* (2013.01); *G07F 17/3225* (2013.01); *G07F 17/3267* (2013.01)

(58) Field of Classification Search
CPC ............. G07F 17/3244; G07F 17/3204; G07F 17/3225; G07F 17/3267
See application file for complete search history.

(56) References Cited

U.S. PATENT DOCUMENTS 9,552,693 B1 * 1/2017 Reeves ............... G07F 17/3239
10,726,678 B1 * 7/2020 Rehill ................... G07F 17/326
2003/0050111 A1 * 3/2003 Saffari ................ G07F 17/3255 463/25
2003/0232638 A1 * 12/2003 Luciano, Jr. ............ G07F 17/32 463/19
2004/0038733 A1 * 2/2004 Walker ................ G07F 17/3244 463/25
2004/0172508 A1 * 9/2004 Nguyen .............. G06F 11/1666 711/162
2006/0025206 A1 * 2/2006 Walker .................... G07F 17/32 463/20
2007/0057464 A1 * 3/2007 Cockrell ................... A63F 1/00 273/303
2007/0099695 A1 * 5/2007 Wilson .................... G07F 17/34 463/25
2008/0039190 A1 * 2/2008 Walker .................... G07F 17/32 463/25
2008/0242421 A1 * 10/2008 Geisner ................... A63F 13/75 463/42

(Continued)

*Primary Examiner* — Jeffrey K Wong

(74) *Attorney, Agent, or Firm* — Bradley Arant Boult Cummings LLP; Adam J. Thompson, Esq.

(57) ABSTRACT

The gaming device can generate outcomes for wagering games. For each wagering game, the gaming device can increment the hand count for the wagering game. The gaming device can receive a request to cash out the wagering game. The gaming device can determine that the current credit value falls below a minimum threshold for performing the cash out. The gaming device can identify game features for the user to purchase with the current credit value. The gaming device can filter the game features based on criteria. The gaming device can generate a user interface for receiving a selection of the game features. The gaming device can process a transaction to purchase the selected game features.

19 Claims, 5 Drawing Sheets

(56) References Cited

U.S. PATENT DOCUMENTS

| | | | | |
|---|---|---|---|---|
| 2012/0064961 | A1* | 3/2012 | Vancura | G07F 17/3265 463/20 |
| 2013/0157751 | A1* | 6/2013 | Loose | G07F 17/3211 463/25 |
| 2014/0114890 | A1* | 4/2014 | Fujimaki | G06N 20/00 706/12 |
| 2015/0045112 | A1* | 2/2015 | Donavan | G07F 17/3209 463/25 |
| 2015/0072770 | A1* | 3/2015 | Simongini | G07F 17/3244 463/25 |
| 2016/0063799 | A1* | 3/2016 | Reeves | G07F 17/326 463/17 |
| 2016/0358424 | A1* | 12/2016 | Thomas | G07F 17/3272 |
| 2017/0092059 | A1* | 3/2017 | Nelson | G07F 17/3225 |

* cited by examiner

LIMITED PAYOUT SYSTEMS AND METHODS

TECHNICAL FIELD

The present systems and processes relate to utilizing computing technology to provide remaining-credit game features when limiting payouts.

BACKGROUND

Gaming devices can limit payouts for wagering games. Limiting payouts can prevent the entire amount of credits from being paid out when the gaming device receives a request to cash out. As a result of limiting payouts, wagering games lack the necessary technical capabilities to provide patrons with value, and instead a relatively small quantity of credits may be left on a gaming device without an option to cash out the remaining credits. Payout limitations can discourage patrons from playing wagering games with limited payouts. Therefore, there is a long-felt but unresolved need for gaming technology to facilitate patrons to use remaining credits for game features.

BRIEF SUMMARY OF THE DISCLOSURE

Aspects of the present disclosure generally relate to limiting payouts and providing remaining-credit game features for wagering games. A gaming device can generate an outcome for a wagering game. The gaming device can modify the current credits balance for the wagering game depending on the outcome. The gaming device can increase a hand count meter each time the wagering game is played. The gaming device can receive a request to cash out (e.g., initiate a payout of the current credits).

The gaming device can determine the payout amount based on the hand count and current credits. The gaming device can require that the current credits value exceed a threshold for allowing a cash out. If the current credits value falls below the threshold, a cash out can be prohibited. The gaming device can require that a payout amount be limited to the current hand count multiplied by a predetermined value. The gaming device can subtract the payout amount from the current credits value to determine a remainder amount. The gaming device can payout the payout amount, but not payout the remainder amount.

The gaming device can allow for the patron (e.g., a user) to purchase game features using the current credits value or the remainder amount. Game features can include, but are not limited to, upgraded payout tables, levels on progressive jackpots, games of skill, unlocked graphics, and wild symbols. The gaming device can communicate with a gaming system for the patron to purchase the game features. The gaming device can require that the patron provides credentials or a user identifier for a user account to purchase the game features. The game features can be purchased for use on a mobile gaming platform.

The gaming device can communicate with a gaming service to identify the game features. The gaming service can filter the game features based on criteria. The gaming service can exclude game features that have previously been purchased by the user account. The gaming service can exclude game features if the cost of the game feature exceeds the current credits or remainder amount. The gaming service can exclude game features if the game feature is incompatible with the gaming device. The gaming device can present the filtered game features on a user interface and prompt the patron to select one or more game features for purchase. The patron can be prompted to provide credentials for the user account. The patron can be prompted to select a quantity of game plays or time period for the game feature to be available.

The gaming device can receive the selections via an input device. The gaming device can transmit the selections to the gaming service to process the transaction. The gaming service can subtract the cost of the game features from the current credits or the remainder amount. If the cost of the game features is less than the current credits or remainder amount, the gaming service can save the remaining credits for future use by the user account or iteratively facilitating selections of additional game features until the remainder amount is zero or below a minimum cost of any game feature. The gaming service can save the purchase game features as user account data so that the user account can access the features at a later time.

The gaming service can prompt the gaming device to enable to purchase features. If the patron selected to purchase game features on the mobile gaming platform, the gaming service can communicate with the mobile gaming platform to enable to game features. The gaming service can link the user account with a user account for the mobile gaming platform.

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
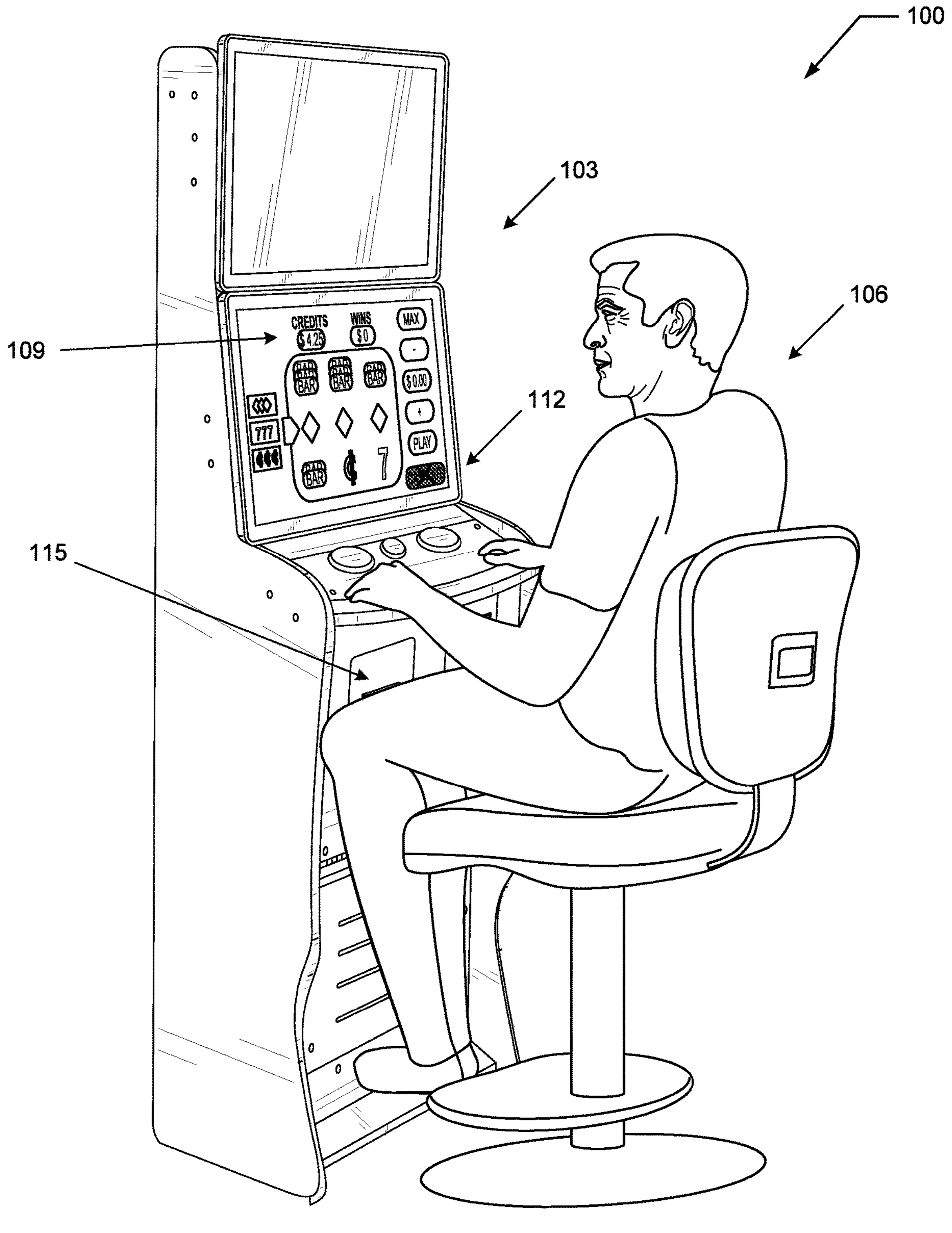
FIG. 1 illustrates an exemplary limited payout system according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Exemplary Embodiments

Referring now to the figures, for the purposes of example and explanation of the fundamental processes and components of the disclosed systems and processes, reference is made to FIG. 1, which illustrates the limited payout system 100. The system 100 can include a gaming device 103 being played by a user 106. The gaming device 103 can facilitate play of and generate outcomes for a wagering game by the user 106. The gaming device 103 can display the credits 109. As an example, the credits 109 may be $4.25. As will be understood by one having ordinary skill in the art, the gaming device 103 can be configured to limit a payout of the full amount of the credits 109. The gaming device 103 can limit the payout of the credits 109 based on a hand count (e.g., a count of the number of games played) and/or the amount of the credits 109. In this example, the gaming device 103 can limit the payout of the credits 109 and the cash out button 112 can be disabled. The cash out button 112, if enabled, can allow for the user 106 to request that the credits 109 be cashed out (e.g., paid out to the user 106).

Rather than requiring that the user 106 either play through the credits 109 or leave the credits 109 on the gaming device 103, the gaming device 103 can provide the user 106 with a user interface to facilitate the purchase one or more game features to be used on the gaming device 103. The user 106 can use the credits 109 to unlock or acquire one or more game features. The game features can include, but are not limited to, a set of graphics, a wild symbol, a bonus game, a payback feature, an upgraded pay table, nudging attempts, a visual skin, a game of skill, assigning the wagering game to a particular level of a progressive jackpot, and a game unavailable on the gaming device 103. The user 106 can provide credentials for a user account to purchase the game features. The gaming device 103 can authenticate the user 106 using reading hardware 115, such as a player tracking module, a radio frequency identifier (RFID) reader, a card reader, a near field communication (NFC), such as Bluetooth circuitry, Wi-Fi circuitry, or other wireless antenna-based technology. In some embodiments, the user 106 can insert a patron tracking card into the reading hardware 115 of the gaming device 103 to authenticate the user account. In another embodiment, the gaming device 103 can read a user identifier from using near field communication (NFC) from the reading hardware 115. The game features can be linked to a user account for the next time that the user 106 plays on the gaming device 103. The game features can be purchased for a limited quantity of plays or for a period of time. The game features can be purchased for use on a mobile gaming platform. For example, the user 106 can link their user account for the gaming device 103 to a mobile gaming platform user account. The credits 109 can be transferred to the mobile gaming platform user account. The credits 109 can be used to purchase a game feature for use on the mobile gaming platform.

Figure 2:
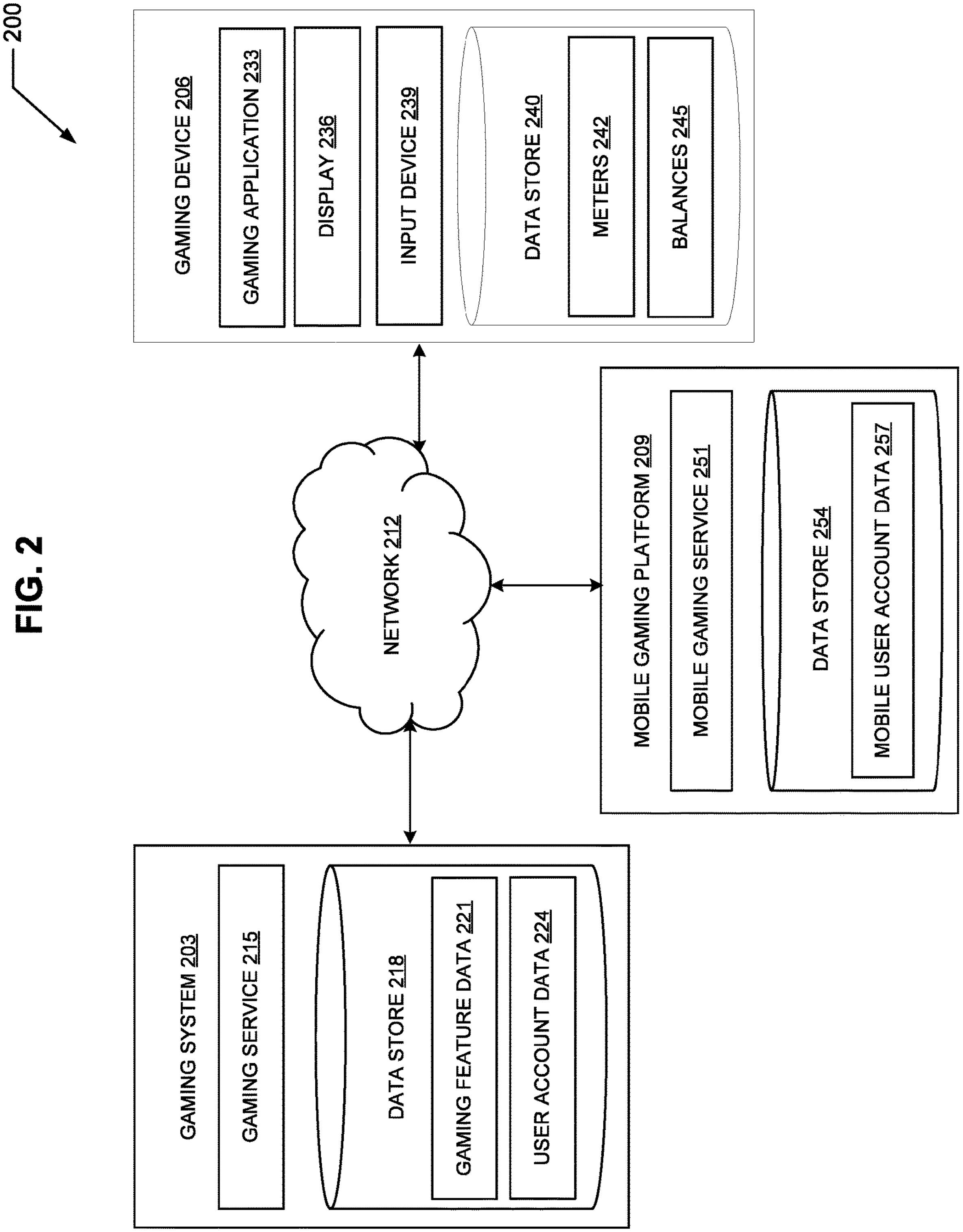
FIG. 2 illustrates an exemplary networked environment according to various embodiments of the present disclosure.

Referring now to FIG. 2, shown is an exemplary networked environment 200 for the limited payout system according to various embodiments of the present disclosure. As will be understood and appreciated, the exemplary networked environment 200 shown in FIG. 2 represents merely one approach or embodiment of the present system, and other aspects are used according to various embodiments of the present system. Exemplary networked environment 200 can include, but is not limited to, a gaming system 203, the gaming device 206, and the mobile gaming platform 209 connected over a network 212.

The elements of the gaming system 203 and the mobile gaming platform 209 can be provided via one or more computing devices that may be arranged, for example, in one or more server banks or computer banks or other arrangements. Such computing devices can be located in a single installation or may be distributed among many different geographical locations. For example, the gaming system 203 and the mobile gaming platform 209 can include one or more computing devices that together may include a hosted computing resource, a grid computing resource, or any other distributed computing arrangement. In some cases, the gaming system 203 and the mobile gaming platform 209 can correspond to an elastic computing resource where the allotted capacity of processing, network, storage, or other computing-related resources may vary over time. Regardless, the gaming system 203 and the mobile gaming platform 209 can include one or more processors and memory having instructions stored thereon that, when executed by the one or more processors, cause the gaming system 203 and the mobile gaming platform 209 to perform one, some, or all of the actions, methods, steps, or functionalities provided herein.

The gaming system 203 can include a gaming service 215 and the data store 218. The gaming service 215 can correspond to one or more software executables that can be executed by the gaming system 203 to perform the functionality described herein. Various data can be stored in the data store 218, including but not limited to, the gaming feature data 221 and user account data 224.

The gaming service 215 can communicate with multiple gaming devices 206. The gaming service 215 can receive and transmit messages and data with multiple gaming devices 206. The gaming service 215 can communicate with the mobile gaming platform via the mobile gaming service 251. The gaming service 215 can authenticate a user account based on the user account data 224. For example, the gaming service 215 can receive credentials and/or a user identifier from the gaming application 233, such as via the reading hardware 115 (FIG. 1). The gaming service 215 can compare the provided credentials and/or user identifier to the user account data 224 to authenticate the user account. The gaming service 215 can retrieve data associated with the user account data 224, including retrieving previously purchased game features and saved credit values.

The gaming service 215 can retrieve the game features saved as the gaming feature data 221. The game features can include, but are not limited to, a set of graphics, a wild symbol, a bonus game, a payback feature, an upgraded pay table, nudging attempts, a visual skin, a game of skill, assigning the wagering game to a particular level of a progressive jackpot, a game unavailable on the gaming device 206, and game features for the mobile gaming platform 209. The gaming service 215 can search and filter the game features based on criteria. The criteria can be identified based on the user account, the current wagering game, the gaming device 206, current credit value, and/or remainder amount (e.g., the current credit value less the payout amount). The criteria can include excluding game features previously purchased by the user account, game features unavailable for the current wagering game or on the gaming device 206, and game features with a cost exceeding the current credit value. If the user has not yet provided valid credentials, the criteria can include excluding game features that require authenticating a user account. In one embodiment, the gaming service 215 can purchase a game feature without authenticating a user account. The gaming service 215 can print a ticket representing the game feature. When the printed ticket is inserted into another gaming device 206 (or the same gaming device 206), the gaming service 215 can enable the game feature on the current session of the gaming device 206. In one embodiment, if the user authenticates a user account before or after inserting the ticket, the gaming service 215 can enable that game feature for that user account based on the ticket. In another embodiment, the gaming service 215 can generate a QR code that links to a site corresponding to the purchase of the game feature or the current session. When the site is accessed, the system can facilitate authenticating a user account. Once authenticated, the system can enable the purchased game feature in the user account.

The gaming service 215 can process the transaction to purchase game features. The gaming service 215 can subtract or deduct the cost of the game features from the user's credits and enable the game features for the user account. For example, the gaming service 215 can subtract the cost of the game features from the current credit value (e.g., the amount of credits the user has left), the remainder amount (e.g., the current credit value less the payout amount), and/or stored credits (e.g., credits that were previously saved as the user account data 224). The gaming service 215 can transmit a message to the gaming application 233 and the mobile gaming service 251 to enable the purchased game features. For example, the gaming service 215 can initiate an electronic transfer of funds from the game to the mobile gaming service 251 in the amount of the game feature.

According to various embodiments, the gaming device 206 can include any device capable of accessing network 212 including, but not limited to, a computer, smartphone, tablets, or other device. The gaming device 206 can be a gaming cabinet, an amusement device, a slot machine, or other gaming device with a processor-based system such as a computer system. The gaming device 206 can include a processor and a data store 240. The gaming device 206 can include a display 236 on which various user interfaces can be rendered to allow users to configure, monitor, control, and command various functions of the gaming application 233. The gaming device 206 can include the input device 239 for a user to provide various inputs (e.g., selections, wagers, credentials). The input device 239 can include one or more buttons, touch screens including three-dimensional or pressure-based touch screens, camera, finger print scanners, accelerometer, retinal scanner, gyroscope, magnetometer, or other input devices. The input device 239 can also include a bill acceptor, a player tracking module, a ticket printer, or some other device. In various embodiments, gaming device 206 can include multiple computing devices. Regardless, the gaming device 206 can include one or more processors and memory having instructions stored thereon that, when executed by the one or more processors, cause the gaming device 206 to perform one, some, or all of the actions, methods, steps, or functionalities provided herein. The gaming device 206 can be configured to execute various applications, such as the gaming application 233 and/or other applications. The gaming application 233 may be executed in a gaming device 206, for example, to access network content served up by the gaming system 203, and/or other servers, thereby rendering various user interfaces on the display 236.

The gaming application 233 can receive bets and generate outcomes for wagering games. The gaming application 233 can modify the meters 242 and balances 245 stored in the data store 240, such as the current hand count meter, the coin-in meter, and the current credit balance. For example, the gaming application 233 can increase the current hand count meter each time a wagering game is played. The gaming application 233 can receive a request to cash out (e.g., initiate a payout event) from the input device 239. The gaming application 233 can determine the payout amount (e.g., the amount paid out to the user) based on the current hand count meter and current credit balance.

The gaming application 233 can receive inputs from the user via the input device 239. For example, the gaming application 233 can receive selections for game features from the user. The gaming application 233 can receive credentials and/or a user identifier associated with the user account data 224. The gaming application 233 can transmit the inputs to the gaming service 215. The gaming application 233 can enable the selected game features after processing the transaction to purchase the game features.

The mobile gaming service 251 can communicate with the gaming service 215 and the gaming application 233. While the gaming service 215, the gaming application 233, and the mobile gaming service 251 are described as different services, it can be appreciated that the functionality of these services can be implemented in one or more different services executed in the networked environment 200. The mobile gaming service 251 can authenticate the mobile gaming user account. The mobile gaming service 251 can compare the received credentials against the mobile user account data 257 in the data store 254. The mobile gaming service 251 can enable game features on the mobile gaming platform 209.

The mobile gaming service 251 can communicate with the gaming service 215 to link a mobile gaming user account with a user account for the gaming system 203. For example, the mobile gaming service 251 can transmit a mobile gaming platform user identifier to the gaming service 215. The gaming service 215 can access the user account data 224 to link the user accounts. The user account data 224 can be a data table containing all data related to user accounts. The user account data 224 can be one or more data column in a user account table storing the foreign key in the mobile gaming platform corresponding to the mobile gaming platform user account. The gaming service 215 can save the mobile gaming platform user identifier as a data field for the associated user account.

The network 212 can include, for example, the Internet, intranets, extranets, wide area networks (WANs), local area networks (LANs), wired networks, wireless networks, or other suitable networks, etc., or any combination of two or more such networks.

Figure 3:
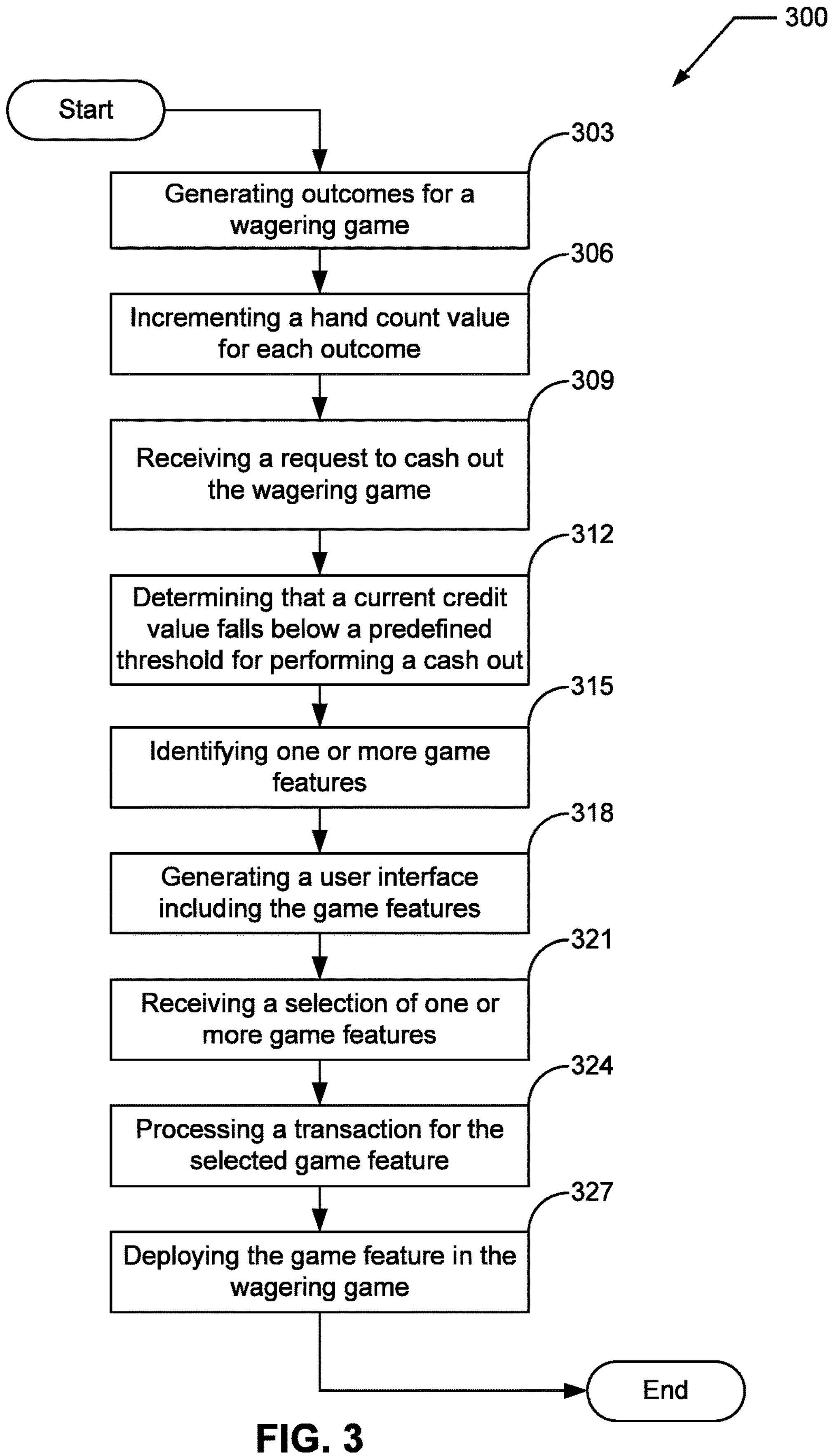
FIG. 3 illustrates an exemplary overall process for the disclosed system according to various embodiments of the present disclosure.

Referring now to FIG. 3, shown is an exemplary, high-level overview process 300 according to various embodiments of the present disclosure. As will be understood by one having ordinary skill in the art, the steps and processes shown in FIGS. 3-5 may operate concurrently and continuously, are generally asynchronous and independent, can be performed in part or in whole by a combination of one or more of the gaming system 203, the gaming device 206, and the mobile gaming platform 209, and are not necessarily performed in the order shown and various steps can be executed linearly or in parallel. Process 300 can be performed entirely, partially, or in coordination with the gaming service 215, the gaming application 233, and the mobile gaming service 251.

At step 303, the process 300 can include generating one or more outcomes for one or more wagering games. The gaming application 233 can generate one or more outcomes for one or more wagering games. Generating the outcomes can include receiving a bet for a wagering game. Multiple bets can be received for multiple wagering games. As an example, the gaming application 233 can iteratively: 1) receive a bet input, and 2) generate an outcome for the wagering game. After receiving the bet, an outcome can be generated for each wagering game and render the outcome on the display 236. In response to generating the outcomes, the meters and balances for the wagering game can be modified. The coin-in meter can be decremented. The credits balance can be increased or decreased based on the outcome of the wagering game. For example, if the outcome is a win, then the credits balance can be increased.

At step 306, the process 300 can include incrementing a hand count value for each outcome. The gaming application 233 can increment the hand count value for each outcome of each wagering game. The hand count meter (e.g., a meter that can track the current hand count value) can increase the hand count value each time the wagering game is played. For example, the hand count meter can increment the hand count value by 1 each time a wagering game is played. Regardless of the outcome of each wagering game, the hand count value can be increased by 1 each time a wagering game is played. The hand count value can be incremented by any value (e.g., 1, 5, 10, 20, any other suitable value) each time a wagering game is played. If multiple wagering games are played, a hand count value can be incremented for each wagering game.

At step 309, the process 300 can include receiving a request to cash out the wagering game. The gaming application 233 can receive the request to cash out from the input device 239. The request to cash out can initiate a payout event (e.g., the payout value is paid out to the user playing the wagering game). The request to cash out can be an input from the user of the wagering game. In some embodiments, the user can request a cash out from an attendant or at a kiosk. In one embodiment, the current credit meter may be below a cash out threshold value, and thus the cash out event does not result in any monies being paid to the user, but rather the user is presented with game features as discussed herein.

At step 312, the process 300 can include determining that a current credit value falls below a predefined threshold for performing a cash out. The gaming application 233 can determine that a current credit value falls below a predefined threshold for performing a cash out. The credit balance can display and track the current credit value. The predefined threshold can be any predetermined value (e.g., $1, $2, $5, $10, any other suitable value). For example, the current credit value can be $4.25 and the predefined threshold can be $5. Since the current credit value (e.g., $4.25) falls below the predefined threshold (e.g., $5), the cash out (e.g., payout) will be prohibited.

At step 315, the process 300 can include identifying one or more game features. The gaming application 233 can identify the one or more game features. When the current credit value falls below the predefined threshold, the current credit value can be used to purchase one or more game features. The game features can include, but are not limited to, a set of graphics, a wild symbol, a bonus game, a payback feature, an upgraded pay table, nudging attempts, a visual skin, a game of skill, and assigning the wagering game to a particular level of a progressive jackpot. The game feature can include a wagering game or game of skill not available on the gaming device 206. For example, the gaming service 215 can retrieve the unavailable game from the gaming feature data 221 and provide the unavailable games to the gaming application 233. The gaming application 233 can allow the user to play the unavailable game. The game features can be identified based on user purchase history, the current wagering game, or the cost of the game. The game features can be identified by process 400 illustrated by FIG. 4 or any other method.

The game features can be purchased for use by a particular user account. For example, a graphics set or visual skin can be purchased for a particular user account. The user can provide credentials for a user account at the input device 239. The credentials can include a user or patron identifier. The gaming application 233 can authenticate the credentials with the gaming service 215. The gaming service 215 can save the game features with the user account data 224. For example, the next time the user provides their credentials to gaming application 233, the gaming application 233 can retrieve the graphics set or visual skin from the gaming service 215 and provide the user with the graphics set or visual skin for use during the wagering games. A user account can be required to purchase the game features. For example, the current wagering games can be associated with a user account. The current wagering games can be assigned to a particular level of a progressive jackpot.

The game features can be purchased for use for a limited amount of game plays or a limited amount of time. A game feature can be purchased for a limited amount of game plays (e.g., 5 plays, 10 plays, 100 plays, 1,000 plays, any other suitable amount of game plays). For example, an upgraded pay table or a level of a progressive jackpot can be enabled for 1,000 game plays. A game feature can be purchased for a limited amount of time (e.g., 5 minutes, 10 minutes, 1 hour, 24 hours, any other suitable period of time). For example, an upgraded pay table or level of a progressive jackpot can be assigned for 1 hour. The time period can be a period of play time (e.g., a period of time actively playing the game) or a period of time elapsed (e.g., a period of time regardless of whether or not the user is actively playing the game).

The game features can be purchased for use on a different gaming platform. The different gaming platform can be a different gaming device or a mobile gaming platform, including a mobile or desktop gaming platform. The game features on the mobile gaming platform can include, but are not limited to, a set of graphics, a wild symbol, a bonus game, a payback feature, an upgraded pay table, nudging attempts, a visual skin, a game of skill, a title, or assigning the wagering game to a particular level of a progressive jackpot. Rather than using the current credit value to purchase a game feature, the game feature can include assigning some or all of the current credit value to the mobile gaming platform user account. The gaming application 233 can transmit a request to the mobile gaming service 251 to enable the selected feature for the mobile gaming platform user account. For example, the user account for the gaming service 215 can be linked to or associated with a mobile gaming platform user account. The user can provide credentials for the mobile gaming platform user account and the gaming application 233 can authenticate the credentials with the mobile gaming service 251.

At step 318, the process 300 can include generating a user interface including the identified game features. The gaming application 233 can generate a user interface including the identified game features and display the user interface on the display 236. The user interface can be a pop window that can be displayed on top of or over the wagering game user interface. The user interface can prompt the user to select a game feature and provide user account credentials. The user interface can display the current credit value or the credit balance. The user interface can include a price for each of the game features. The user interface can include options for the game features to be enabled for a limited amount of game plays or period of time. The user interface can include options for the game features to be enabled on the mobile gaming platform.

At step 321, the process 300 can include receiving a selection of one or more game features. The gaming application 233 can receive the selected game features via the input device 239. The gaming application 233 can receive the provided credentials and other selections, including the amount of game plays or period of time for the game feature to be enabled and enabling the game features on the mobile gaming platform. The gaming application 233 can transmit the selections and inputs to the gaming service 215.

At step 324, the process 300 can include processing the transaction for the selected game features. The gaming application 233 can transmit the selections and inputs to the gaming service 215. The gaming service 215 can subtract the cost of the game features from the current credit value and enable the game features for the provided user account. For example, the gaming service 215 can authenticate the provided user account credentials prior to enabling the feature. The gaming service 215 can save the user account credentials and the selected game features as the user account data 224. The gaming service 215 can transmit a message to the gaming application 233 to enable the game features on the gaming device 206 for the user account.

As an example, the face value of the selected game feature may exceed current credit value. If the selected game feature exceeds the current credit value, the gaming application 233 can provide the option for the user to pay the remaining balance on the selected game feature. The gaming application 233 can process the transaction for the selected game feature by subtracting the current credit value from the face value of the game feature. Then, the gaming application 233 can prompt the user to pay for the remaining balance of the face value of the game feature. In another example, the face value of the selected game feature may exceed the current credit value. The gaming application 233 can layaway the remainder of the current credit value towards the future purchase of a game feature (e.g., save the remainder as the user account data 224).

If the user selected to enable the game features on the mobile gaming platform, the gaming service 215 can authenticate the provided credentials for the mobile gaming platform user account with the mobile gaming service 251. The gaming service 215 can link the user account for the gaming system 203 with the user account for the mobile gaming platform. The gaming service 215 can transmit a message to the mobile gaming service 251 to enable the game features for the user account.

At step 327, the process 300 can include deploying the game features in the wagering game. The gaming application 233 or the mobile gaming service 251 can enable the game features. The game features may only be enabled after the user provides the credentials for the user account. If the game feature was selected for a limited quantity of plays, the user can play the game with the game feature for the limited quantity of plays. Once the quantity of plays is completed, the game feature can be disabled. If the game feature was selected for a period of time, once the period of time has elapsed, the game feature can be disabled.

Figure 4:
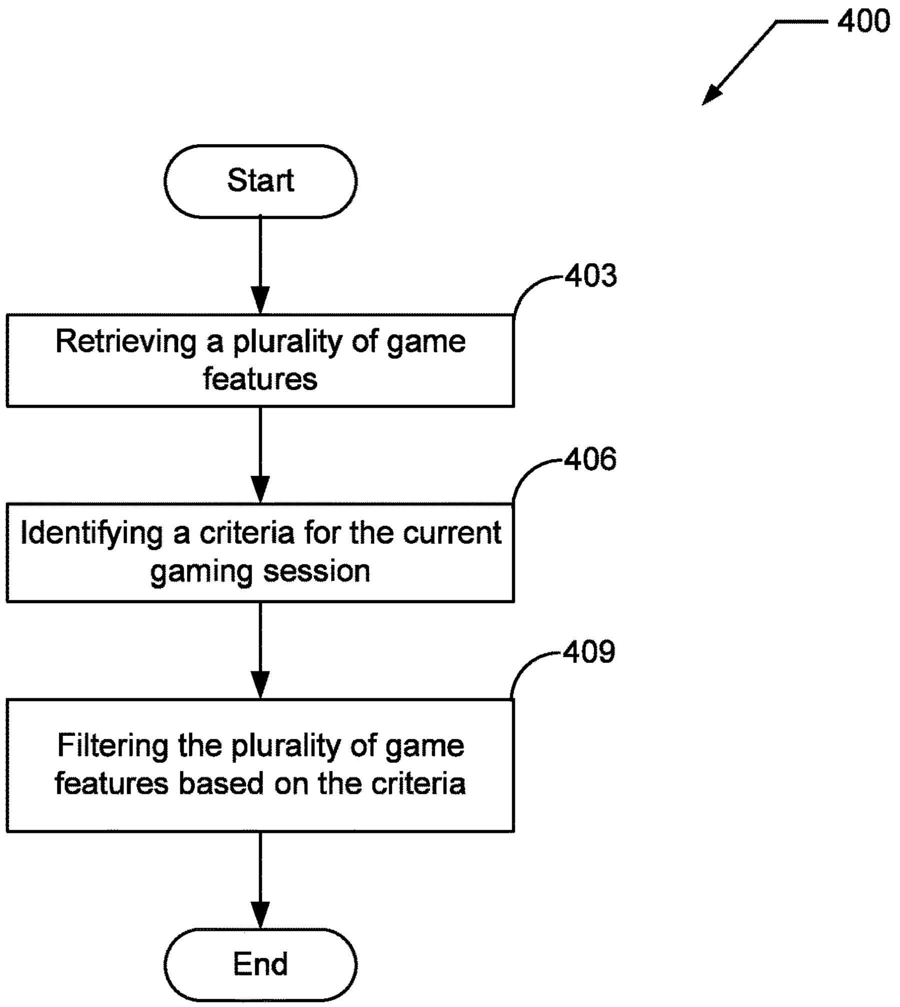
FIG. 4 illustrates an exemplary process for identifying game features according to various embodiments of the present disclosure.

Referring now to FIG. 4, shown is an exemplary process 400 for identifying one or more game features. As will be understood by one having ordinary skill in the art, the steps and processes in the process 400 can replace or supplement step 315 in the process 300 and step 515 in the process 500. Process 400 can be performed entirely, partially, or in coordination with the gaming service 215, the gaming application 233, and the mobile gaming service 251.

At step 403, the process 400 can include retrieving a plurality of game features. The gaming application 233 can retrieve the game features by transmitting a message to the gaming service 215. The gaming service 215 can retrieve all or some of the game features stored as the gaming feature data 221. At step 406, the process 400 can include identifying a criteria for the current gaming session. The gaming application 233 can identify a criteria for the current gaming session. The criteria can be identified based on the user account, the current wagering game, the gaming device 206, current credit value, and/or remainder amount (e.g., the current credit value less the payout amount). The criteria can include excluding game features previously purchased by the user account, game features unavailable for the current wagering game or on the gaming device 206, and game features with a cost exceeding the current credit value. If the user has not yet provided valid credentials, the criteria can include excluding game features that require authenticating a user account.

In some embodiments, the gaming service 215 can load gaming feature data 221 including historical game feature purchase histories across various user accounts and wagering games. The historical purchase histories can include the criteria as metadata from when the historical game features were purchased. The gaming service 215 can generate a behavior profile for each user account, which can be stored when the user account purchases each game feature. The behavior profile can include preference scores for various types of games, bonuses, bonus games, progressive eligibility, required skill, etc. The behavior profile can include betting histories such as average bet amount per session, frequency of playing each denomination, frequency of playing each game, preferred funding mechanism, history of credits left on gaming devices 206. The gaming service 215 can train an artificial intelligence/machine learning (AIML) model to score various game features. The gaming service 215 can analyze data corresponding to a current user account, the behavior profile for the current user account, and identified criteria to generate parameters. The gaming service 215 can process the parameters using the AIML model to generate scores for each of the game features. Each score can be predictive of a likelihood the current user account will want the corresponding game feature. The gaming service 215 can rank the game features according to the score from high to low. In some embodiments, the gaming service 215 can filter out game features with scores falling below a predefined threshold.

At step 409, the process 400 can include filtering the game features based on the criteria to generate a subset of game features. The gaming service 215 and/or the gaming application 233 can filter the game features based on the criteria. For example, if the criteria is excluding game features previously purchased by the user account and the user account previously purchased a graphics set, the graphics set will be filtered from the subset. As another example, the upgraded pay table can cost $20 and the current credit value or remainder amount can be $9. If the criteria is excluding game features with a cost higher than the current credit value or remainder amount, then the upgraded pay table can be filtered from the subset. In another example, the game of skill can be unavailable for the current wagering game. If the criteria is excluding game features that are unavailable for the current wagering game, the game of skill will be filtered from the subset.

Figure 5:
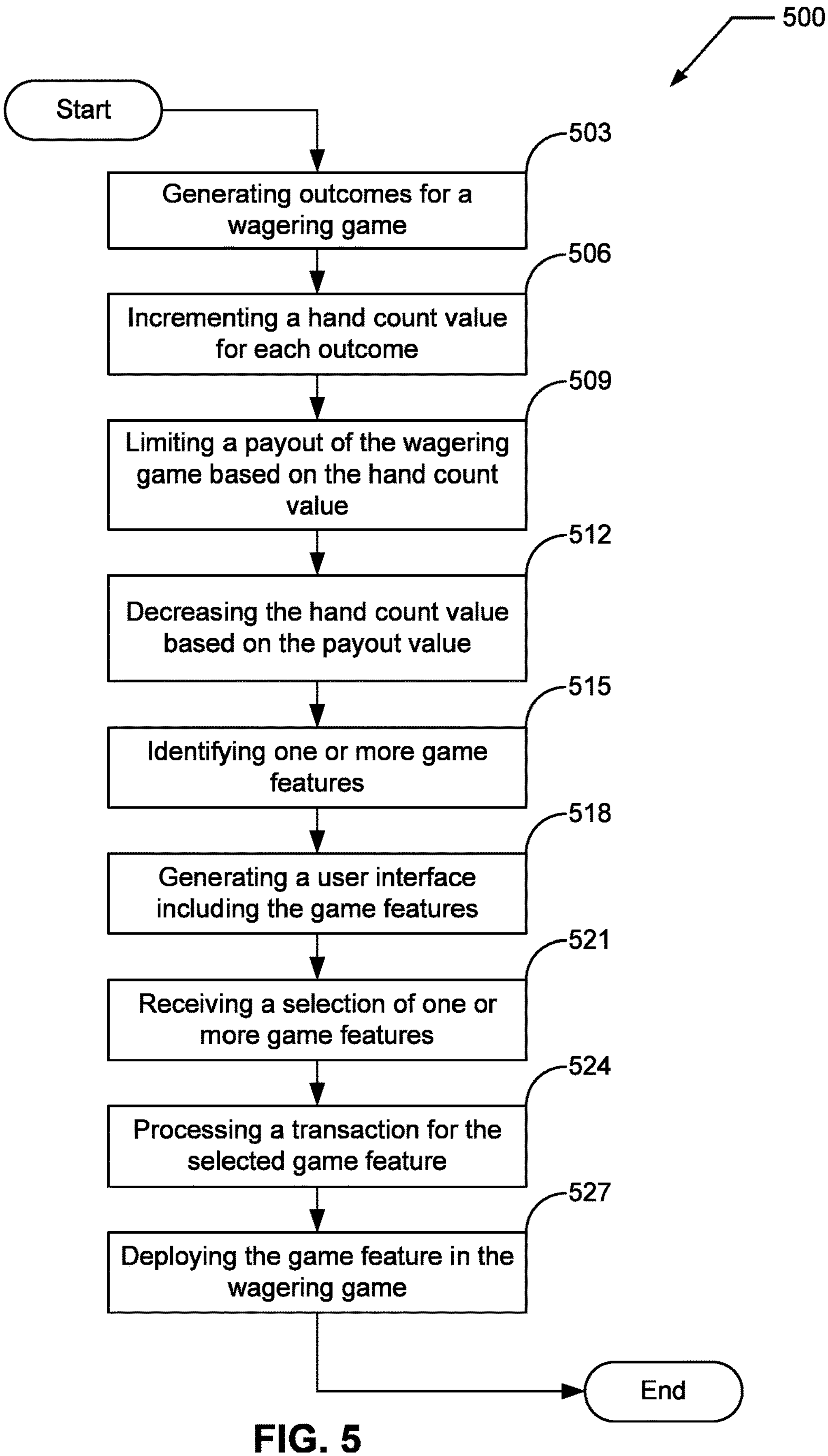
FIG. 5 illustrates an exemplary overall process according to various embodiments of the present disclosure.

With reference to FIG. 5, shown is an exemplary, high-level process 500. As will be understood and appreciated, the process 500 can be in alternative to or in addition to the process 300. Any of the steps from the process 300 can be swapped or replaced with the steps from the process 500, or vice versa. At step 503, the process 500 can include generating one or more outcomes for a wagering game. The gaming application 233 can generate an outcome of the wagering game. Generating the outcomes can include receiving a bet for a wagering game. Multiple bets can be received for multiple wagering games. After receiving the bet, an outcome can be generated for each wagering game and render the outcome on the display 236. The gaming application 233 can modify one or more meters or balances in response to generating the outcome. The meters can include a coin-in meter and a hand count meter. For example, the gaming application 233 can increment the hand count meter. The gaming application 233 can decrement the coin-in meter. The balances can include a current credits balance, which can track and display a current credit value. The gaming application 233 can decrement a current credit balance. The gaming application 233 can modify the current credit balance based on the outcome or when a payout event is initiated (e.g., when a user requests a cash out).

At step 506, the process 500 can include incrementing a hand count value for each outcome. The gaming application 233 can increment the hand count value each time a wagering game is played regardless of the outcome. The hand count meter can track and display the current hand count value. The hand count value can be incremented by any value (e.g., 1, 5, 10, 20, any other suitable value) each time a wagering game is played. If multiple wagering games are played, a hand count value can be incremented for each wagering game.

At step 509, the process 500 can include limiting a payout of the wagering game. The gaming application 233 can limit a payout based on current hand count value associated with a user account 224 or one or more gaming devices 206. The current hand count value can be tracked via the hand count meter. Liming a payout can include receiving a cash out request from a user via the input device 239. The cash out request can initiate a payout event, which can include limiting the payout. The gaming application 233 can calculate the payout for the wagering game. The payout can correspond to the current credit value of the current credit meter. The gaming application 233 can determine a payout limit by multiplying the current hand count value by a predetermined value (e.g., $1, $2, $5, $10, or any other suitable value, per hand count credit). The gaming application 233 can limit the payout amount to not exceed the payout limit. The gaming application 233 can determine a remainder amount by subtracting the payout amount from the current credit value.

In an exemplary scenario, the current credit value can be $25 and the current hand count value can be four (4) hand count credits. The gaming application 233 can multiply the current hand count value by a predetermined value of $5 per hand count credit, thereby determining a payout limit of $20. The application 233 can modify the payout amount to be $20 so that the payout amount does not exceed the payout limit of $20. The gaming application 233 can determine a remainder amount of $5 by subtracting the payout limit of $20 from the current credit value of $25.

At step 512, the process 500 can include decreasing the hand count value based on the payout value. The gaming application 233 can decrease the current hand count value based on the current credit value and the predetermined value of the hand count (e.g., $1, $2, $5, $10). The gaming application 233 can calculate a required hand count value equal to the current credit value divided by the predetermined value of the hand count. When the required hand count is greater than the current hand count value, the payout amount can be limited to the predetermined value of the hand count times the current hand count value, and the hand count value can be decreased to 0. When the required hand count is less than or equal to the current hand count value, the payout amount can be the total current credit value and the current hand count value can be decreased by the required hand count. As an example, the current credit value can be $25, the current hand count value can be four (4) hand count credits, and the predetermined value of the hand counts can be $5. The gaming application 233 can determine that the required hand count value is 5 (e.g., the current credit value divided by the predetermined value of the hand counts). Since the required hand count (e.g., 5) is greater than the current hand count value (e.g., 4), the payout amount can be limited to $20 (e.g., the current hand count value multiplied by the predetermined value of the hand counts) and the current hand count can be decreased to 0. In another example, the current credit value can be $15, the current hand count value can be four (4) hand count credits, and the predetermined value of the hand counts can be $5. The gaming application 233 can determine that the required hand count value is 3 (e.g., the current credit value divided by the predetermined value of the hand counts). Since the required hand count (e.g., 3) is less than the current hand count value (e.g., 4), the payout amount can be $15 (e.g., the total current credit value) and the current hand count can be decreased to 1 (e.g., the current hand count value less the required hand count).

At step 515, the process 500 can include identifying one or more game features. The gaming application 233 can identify the one or more game features. The remainder amount can be used to purchase one or more game features. Game features can include, for example, upgraded pay tables, wild symbols, skins, bonus games, nudging attempts, and other game features. The gaming application 233 can identify a game feature based on the remainder amount and a cost of the game feature. The gaming application 233 can search the gaming feature data 221 in the data store 218 to filter all game features with costs at or below the remainder value. For example, a first upgraded pay table feature may have a cost of $1, while a second upgraded pay table feature may have a cost of $2. If the gaming application determines that the remainder amount is $1, the gaming application 133 can identify the first upgraded pay table feature but not the second upgraded pay table feature. In this embodiment, the second upgraded pay table feature can be excluded based on the cost of $2 exceeding the remainder amount of $1, while the first upgraded pay table feature is identified based on the cost of $1 meeting or being less than the remainder amount of $1. As another example, a wild symbol game feature may have a cost of $10 while an upgraded pay table game feature may have a cost of $5. In this example, the gaming application 233 may determine a remainder amount of $20. Based on the $20 remainder value and the costs of the game features, the gaming application 233 can determine that the $20 remainder value can be redeemed for two upgraded payout tables and one wild symbol game feature.

The gaming application 233 can identify one or more game features based on games features the user has already purchased. For example, a potential game feature can include skins for the display 236. The gaming application 233 can identify that the user account 224 already purchased a certain skin. The gaming application 233 can also identify skins that have not already been purchased by the user account.

The game features can include, but are not limited to, a set of graphics, a wild symbol, a bonus game, a payback feature, an upgraded pay table, nudging attempts, a visual skin, a game of skill, or assigning the wagering game to a particular level of a progressive jackpot. As an example, the game feature can cause the gaming service 215 to enroll the wagering game into one or more progressive levels (e.g., a mystery progressive level). In some embodiments, the gaming service 215 may alter a pay table of the game to account for the contribution percentage to the one or more progressive levels. For example, the gaming service 215/gaming application 233 can allocate 1% of a bet amount as being contributed to a particular progressive level. The gaming service 215/gaming application 233 can change a combination of symbols to reduce the average win amount for the game by the contribution amount to the particular progressive (e.g., or a closest available level). As an example, the gaming service 215 can reduce the average payout from 91% down to 90% in response to a game feature causing the gaming device 206 to be enrolled into a progressive level with a 1% contribution. The game feature can include a wagering game or game of skill not available on the gaming device 206. For example, the gaming service 215 can retrieve the unavailable game from the gaming feature data 221 and provide the unavailable games to the gaming application 233. The gaming application 233 can allow the user to play the unavailable game. The game features can be identified based on user purchase history, the current wagering game, or the cost of the game. The game features can be identified by process 400 illustrated by FIG. 4 or any other method.

The game features can be purchased for use by a particular user account. For example, a graphics set or visual skin can be purchased for a particular user account. The user can provide credentials for a user account at the input device 239. The credentials can include a user or patron identifier. The gaming application 233 can authenticate the credentials with the gaming service 215. The gaming service 215 can save the game features with the user account data 224. For example, the next time the user provides their credentials to gaming application 233, the gaming application 233 can retrieve the graphics set or visual skin from the gaming service 215 and provide the user with the graphics set or visual skin for use during the wagering games. A user account can be required to purchase the game features. For example, the current wagering games can be associated with a user account. The current wagering games can be assigned to a particular level of a progressive jackpot.

The game features can be purchased for use for a limited amount of game plays or a limited amount of time. A game feature can be purchased for a limited amount of game plays (e.g., 5 plays, 10 plays, 100 plays, 1,000 plays, any other suitable amount of game plays). For example, an upgraded pay table or a level of a progressive jackpot can be enabled for 1,000 game plays. A game feature can be purchased for a limited amount of time (e.g., 5 minutes, 10 minutes, 1 hour, 24 hours, any other suitable period of time). For example, an upgraded pay table or level of a progressive jackpot can be assigned for 1 hour. The time period can be a period of play time (e.g., a period of time actively playing the game) or a period of time elapsed (e.g., a period of time regardless of whether or not the user is actively playing the game).

The game features can be purchase for use on a different gaming platform. The different gaming platform can be a different gaming device or a mobile gaming platform, including a mobile or desktop gaming platform. The game features on the mobile gaming platform can include, but are not limited to, a set of graphics, a wild symbol, a bonus game, a payback feature, an upgraded pay table, nudging attempts, a visual skin, a game of skill, a title, or assigning the wagering game to a particular level of a progressive jackpot. Rather than using the current credit value to purchase a game feature, the game feature can include assigning some or all of the current credit value to the mobile gaming platform user account. The gaming application 233 can transmit a request to the mobile gaming service 251 to enable the selected feature for the mobile gaming platform user account. For example, the user account for the gaming service 215 can be linked to or associated with a mobile gaming platform user account. The user can provide credentials for the mobile gaming platform user account and the gaming application 233 can authenticate the credentials with the mobile gaming service 251.

At step 518, the process 500 can include generating a user interface including one or more game features. The gaming application 233 can generate a user interface of the identified game features. The gaming application 233 can retrieve the identified game features from the gaming service 215. The user interface can include options to select game features that cost less than or equal to the remainder amount. The user interface can include options to purchase multiple game features based on the remainder amount (e.g., combinations of game features). The user interface can include options to select game features that have not been previously purchased by the user account. The user interface can include recommended game features.

The gaming application 233 can generate a user interface including the identified game features and display the user interface on the display 236. The user interface can be a pop window that can be displayed on top of or over the wagering game user interface. The user interface can prompt the user to select a game feature and provide user account credentials. The user interface can display the current credit value, the credit balance, or the remainder amount. The user interface can include a price for each of the game features. The user interface can include options for the game features to be enabled for a limited amount of game plays or period of time. The user interface can include options for the game features to be enabled on the mobile gaming platform.

At step 521, the process 500 can include receiving a selection of one or more game features. The gaming application 233 can receive the selected game features via the input device 239. The selection can include various data, including, but not limited to, a selection of one or more of the identified game features from the user interface and a patron identifier. The gaming application 233 can receive the provided credentials and other selections, including the amount of game plays or period of time for the game feature to be enabled and enabling the game features on the mobile gaming platform.

The gaming application 233 can communicate with the gaming service 215 to determine various data, such as the current hand count value, the current credits value, the remainder amount, and the payout amount. For example, the gaming application 233 can transmit the patron identifier to the gaming service 215. The gaming service 215 can determine a user account 224 associated with the user identifier. The gaming service 215 can transmit the user account 124 to the gaming application 233.

The gaming application 233 can authenticate the provided credentials to determine the user account 224. The gaming application 233 can verify that the user is associated with the user account 224 based on the credentials and/or user identifier. For example, the input can include a credential. The gaming application 233 can authorize the user account 224 to purchase the selected game feature(s). The gaming service 215 can store the criteria associated with the game features along with the selected game feature(s) in gaming feature data 221. The gaming service 215 can continuously train or iteratively train the AIML models (e.g., as set forth in step 406) with new available data from selections of game features.

At step 524, the process 500 can include processing a transaction for the selected game feature. In one embodiment, the gaming application 233 can process the transaction for the selected game feature. In another embodiment, the gaming application 233 can transmit the selected game features to the gaming service 215 to process the transaction. The gaming application 233 can subtract the value of the selected game feature from the remainder amount or the current credit value. As an example, the face value of the selected game feature may exceed the remainder amount or the current credit value. If the selected game feature exceeds the remainder amount or the current credit value, the gaming application 233 can provide the option for the user to pay the remaining balance on the selected game feature. The gaming application 233 can process the transaction for the selected game feature by subtracting the remainder amount or current credit value from the face value of the game feature. Then, the gaming application 233 can prompt the user to pay for the remaining balance of the face value of the game feature. In another example, the face value of the selected game feature may exceed the remainder amount or current credit value. The gaming application 233 can layaway the remainder of the current credit value towards the future purchase of a game feature (e.g., save the remainder as the user account data 224).

At step 527, the process 500 can include deploying the game feature in the wagering game. The gaming application 233 can authorize the user account 224 purchasing the game feature. The gaming application 233 can assign the purchased game feature to the user account 224. The gaming application 233 can also check the user account 224 for previously purchased game features. The gaming application 233 can enable the purchased game feature and other previously purchased game features in the wagering game. For example, if the selected game feature is a skin, the gaming application 233 can render the game feature on the display 236. As another example, if the selected game feature is an upgraded payout table, the gaming application 233 can enable the upgraded payout table in the wagering game. The gaming application 233 can generate outcomes in the wagering game using the upgraded payout table. The gaming application 233 can generate a specific number of acquired outcomes using the upgraded payout table for the user account 224. The game features may only be enabled after the user provides the credentials for the user account. If the game feature was selected for a limited quantity of plays, the user can play the game with the game feature for the limited quantity of plays. Once the quantity of plays is completed, the game feature can be disabled. If the game feature was selected for a period of time, once the period of time has elapsed, the game feature can be disabled.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The processing unit can include one or more hardware processors. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein. While thresholds are discussed herein as being met when the threshold is exceeded, the system may determine a threshold is met when a value meets or exceeds the threshold.

Clause 1. A method, comprising: generating, via one of one or more computing devices, a plurality of outcomes of a wagering game; receiving, via one of the one or more computing devices, a request to cash out the wagering game; in response to the request to cash out, determining, via one of the one or more computing devices, that a current credit value falls below a predefined threshold for performing a cash out; identifying, via one of the one or more computing devices, a subset of a plurality of game features; generating, via one of the one or more computing devices, a user interface comprising the subset of the plurality of game features; receiving, via one of the one or more computing devices, a selection of a particular feature of the subset of the plurality of game features; and processing, via one of the one or more computing devices, a transaction to purchase the particular feature of the subset of the plurality of game features for a user account using the current credit value.

Clause 2. The method of clause 1 or any other clause herein, wherein processing the transaction to purchase the particular feature comprises enabling at least one wagering game previously unavailable on a particular gaming cabinet.

Clause 3. The method of clause 1 or any other clause herein, wherein a hand count value is incremented for each of the plurality of outcomes.

Clause 4. The method of clause 1 or any other clause herein, wherein the plurality of game features comprise enabling a set of graphics for the wagering game for the user account.

Clause 5. The method of clause 1 or any other clause herein, wherein the plurality of game features comprise at least one of: enabling, for at least part of a particular gaming session, a wild symbol, a bonus game, a payback feature, a pay table, a visual skin, or a game of skill.

Clause 6. The method of clause 1 or any other clause herein, wherein the plurality of game features comprise a game feature on a different gaming platform.

Clause 7. The method of clause 6 or any other clause herein, wherein the different gaming platform comprises a mobile gaming platform and processing the transaction to purchase the game feature on the different gaming platform as the particular feature comprises transmitting a request to the mobile gaming platform to enable the game feature for a particular user account associated with a current platform user account on the mobile gaming platform.

Clause 8. The method of clause 6 or any other clause herein, wherein the game feature on the different gaming platform comprises at least one of: awarding credits on the different gaming platform, enabling a pay table on the different gaming platform, enabling a set of graphics on the different gaming platform, or awarding a title on the different gaming platform.

Clause 9. A system, comprising: a memory; and at least one computing device in communication with the memory, the at least one computing device being configured to at least: generate a plurality of outcomes of a wagering game; receive a request to cash out the wagering game; in response to the request to cash out, determine that a current credit value falls below a predefined threshold for performing a cash out; identify a subset of a plurality of game features; generate a user interface comprising the subset of the plurality of game features; receive a selection of a particular feature of the subset of the plurality of game features; and process a transaction to purchase the particular feature of the subset of the plurality of game features for a user account using the current credit value.

Clause 10. The system of clause 9 or any other clause herein, wherein the at least one computing device is further configured to generate the user interface as a pop up window over the wagering game screen.

Clause 11. The system of clause 9 or any other clause herein, wherein the at least one computing device is further configured to process the transaction to purchase the particular feature by transmitting a message to a gaming service associated with the wagering game to enable the particular feature on the user account.

Clause 12. The system of clause 9 or any other clause herein, wherein the at least one computing device is further configured to identify the subset of the plurality of game features by filtering at least one game feature failing to meet at least one criteria associated with a current gaming session.

Clause 13. The system of clause 12 or any other clause herein, wherein the at least one criteria comprises excluding game features previously purchased by the user account.

Clause 14. The system of clause 12 or any other clause herein, wherein the at least one criteria comprises excluding game features unavailable on a current wagering game.

Clause 15. The system of clause 12 or any other clause herein, wherein the at least one criteria comprises excluding game features with a cost exceeding the current credit value.

Clause 16. A method, comprising: generating, via one of one or more computing devices, a plurality of outcomes of a wagering game, a hand count value being incremented for each of the plurality of outcomes; limiting, via one of the one or more computing devices, a payout of the wagering game to a payout amount with an unpaid balance based on a multiple of the hand count value; decreasing, via one of the one or more computing devices, the hand count value based on the payout of the wagering game and the multiple of the hand count value; identifying, via one of the one or more computing devices, a subset of a plurality of game features; generating, via one of the one or more computing devices, a user interface comprising the subset of the plurality of game features; receiving, via one of the one or more computing devices, a selection of a particular feature of the subset of the plurality of game features; and processing, via one of the one or more computing devices, a transaction to purchase the particular feature of the subset of the plurality of game features for a user account using the unpaid balance.

Clause 17. The method of clause 1 or any other clause herein, wherein processing the transaction to purchase the particular feature comprises assigning one or more wagering games associated with the user account to a particular level of a progressive jackpot.

Clause 18. The method of clause 1 or any other clause herein, wherein the plurality of game features comprise enabling a pay table for the wagering game.

Clause 19. The method of clause 18 or any other clause herein, wherein the pay table is enabled for a particular quantity of games on the wagering game.

Clause 20. The method of clause 18 or any other clause herein, wherein the pay table is enabled for a period of time.

These and other aspects, features, and benefits of the claims will become apparent from the detailed written description of the aforementioned aspects taken in conjunction with the accompanying drawings, although variations and modifications thereto may be effected without departing from the spirit and scope of the novel concepts of the disclosure.

What is claimed is:

1. A method, comprising:
generating, via one or more computing devices, a plurality of outcomes of a wagering game;
receiving, via the one or more computing devices, a request to cash out the wagering game;
in response to the request to cash out, determining, via the one or more computing devices, that a current credit value falls below a predefined threshold for performing a cash out;
in response to the current credit value falling below the predefined threshold for performing the cash out:
preventing, via the one or more computing devices, the cash out from being initiated;
identifying, via the one or more computing devices, a subset of a plurality of game features by filtering at least one game feature failing to meet at least one criteria associated with a current gaming session;
generating, via the one or more computing devices, a user interface comprising the subset of the plurality of game features;
receiving, via the one or more computing devices, a selection of a particular feature of the subset of the plurality of game features; and
processing, via the one or more computing devices, a transaction to purchase the particular feature of the subset of the plurality of game features for at least one subsequent gaming session by unlocking the particular feature for a user account using the current credit value.

2. The method of claim 1, wherein processing the transaction to purchase the particular feature comprises enabling at least one wagering game previously unavailable on a particular gaming cabinet.

3. The method of claim 1, wherein a hand count value is incremented for each of the plurality of outcomes.

4. The method of claim 1, wherein the plurality of game features comprise enabling a set of graphics for the wagering game for the user account.

5. The method of claim 1, wherein the plurality of game features comprise at least one of: enabling, for at least part of a particular gaming session, a wild symbol, a bonus game, a payback feature, a pay table, a visual skin, or a game of skill.

6. The method of claim 1, wherein the plurality of game features comprise a game feature on a different gaming platform.

7. The method of claim 6, wherein the different gaming platform comprises a mobile gaming platform and processing the transaction to purchase the game feature on the different gaming platform as the particular feature comprises transmitting a request to the mobile gaming platform to enable the game feature for a particular user account associated with a current platform user account on the mobile gaming platform.

8. The method of claim 6, wherein the game feature on the different gaming platform comprises at least one of: awarding credits on the different gaming platform, enabling a pay table on the different gaming platform, enabling a set of graphics on the different gaming platform, or awarding a title on the different gaming platform.

9. A system, comprising:
a memory; and
at least one computing device in communication with the memory, the at least one computing device being configured to at least:
generate a plurality of outcomes of a wagering game;
receive a request to cash out the wagering game;
in response to the request to cash out, determine that a current credit value falls below a predefined threshold for performing a cash out;
in response to the current credit value falling below the predefined threshold for performing the cash out:
prevent the cash out from being initiated;
identify a subset of a plurality of game features by filtering at least one game feature failing to meet at least one criteria associated with a current gaming session;
generate a user interface comprising the subset of the plurality of game features;
receive a selection of a particular feature of the subset of the plurality of game features; and
process a transaction to purchase the particular feature of the subset of the plurality of game features for at least one subsequent gaming session by unlocking the particular feature for a user account using the current credit value.

10. The system of claim 9, wherein the at least one computing device is further configured to generate the user interface as a pop up window over a wagering game screen.

11. The system of claim 9, wherein the at least one computing device is further configured to process the transaction to purchase the particular feature by transmitting a message to a gaming service associated with the wagering game to enable the particular feature on the user account.

12. The system of claim 9, wherein the at least one criteria comprises excluding game features previously purchased by the user account.

13. The system of claim 9, wherein the at least one criteria comprises excluding game features unavailable on a current wagering game.

14. The system of claim 9, wherein the at least one criteria comprises excluding game features with a cost exceeding the current credit value.

15. A method, comprising:
generating, via one or more computing devices, a plurality of outcomes of a wagering game, a hand count value being incremented for each of the plurality of outcomes;
limiting, via the one or more computing devices, a payout of the wagering game to a payout amount with an unpaid balance based on a multiple of the hand count value;
decreasing, via the one or more computing devices, the hand count value based on the payout of the wagering game and the multiple of the hand count value;
identifying, via the one or more computing devices, a subset of a plurality of game features by filtering at least one game feature failing to meet at least one criteria associated with a current gaming session;
generating, via the one or more computing devices, a user interface comprising the subset of the plurality of game features;
receiving, via the one or more computing devices, a selection of a particular feature of the subset of the plurality of game features; and
processing, via the one or more computing devices, a transaction to purchase the particular feature of the subset of the plurality of game features for at least one subsequent gaming session by unlocking the particular feature for a user account using the unpaid balance.

16. The method of claim 15, wherein processing the transaction to purchase the particular feature comprises assigning one or more wagering games associated with the user account to a particular level of a progressive jackpot.

17. The method of claim 15, wherein the plurality of game features comprise enabling a pay table for the wagering game.

18. The method of claim 17, wherein the pay table is enabled for a particular quantity of games on the wagering game.

19. The method of claim 17, wherein the pay table is enabled for a period of time.

* * * * *